June 25, 1968  N. NICOLAUS ETAL  3,389,946
CART FOR CARRYING TRAYS
Filed Feb. 16, 1966  3 Sheets-Sheet 2
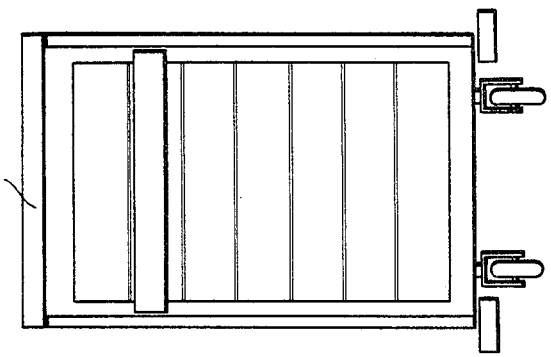
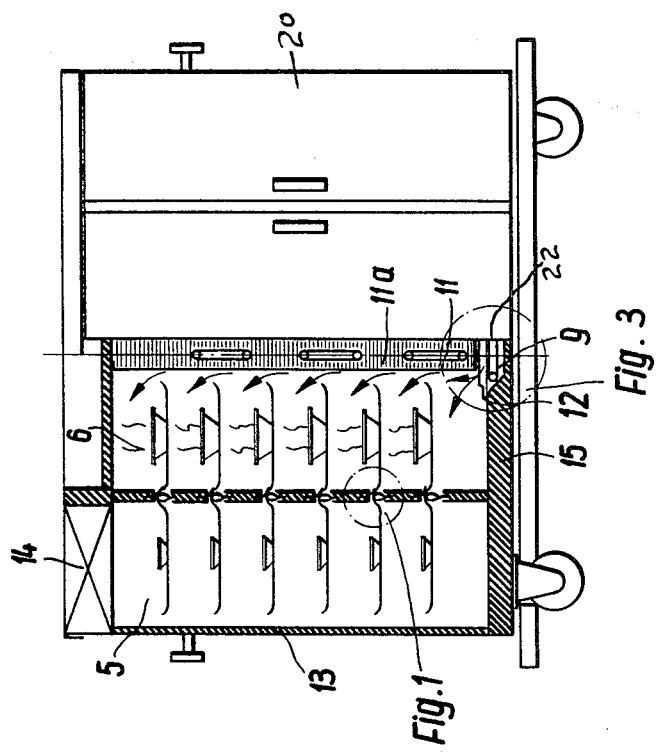
Inventors:
Norbert Nicolaus and Heinz Krügener
By: Burgess, Dinklage & Sprung
Attorneys

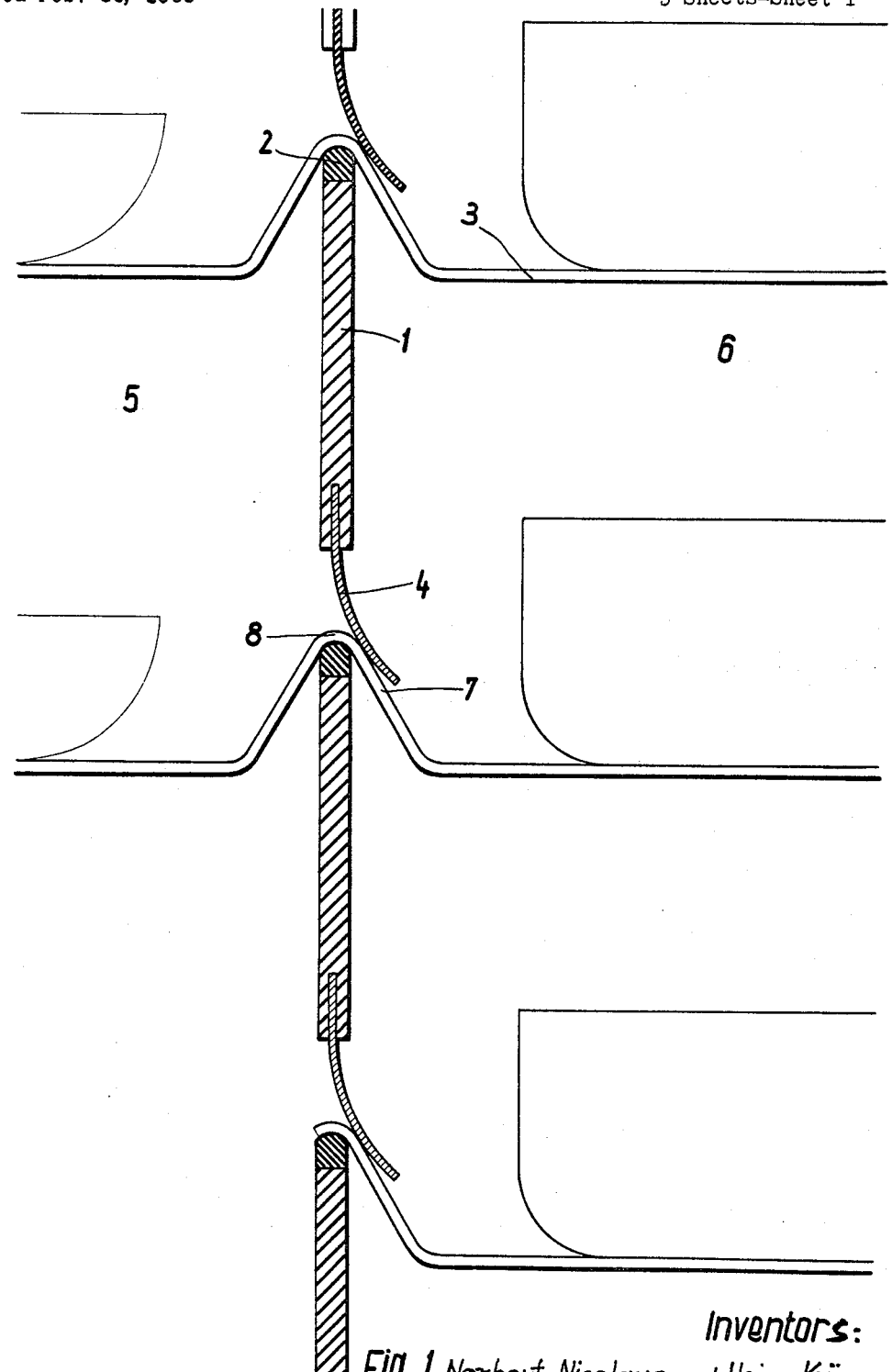

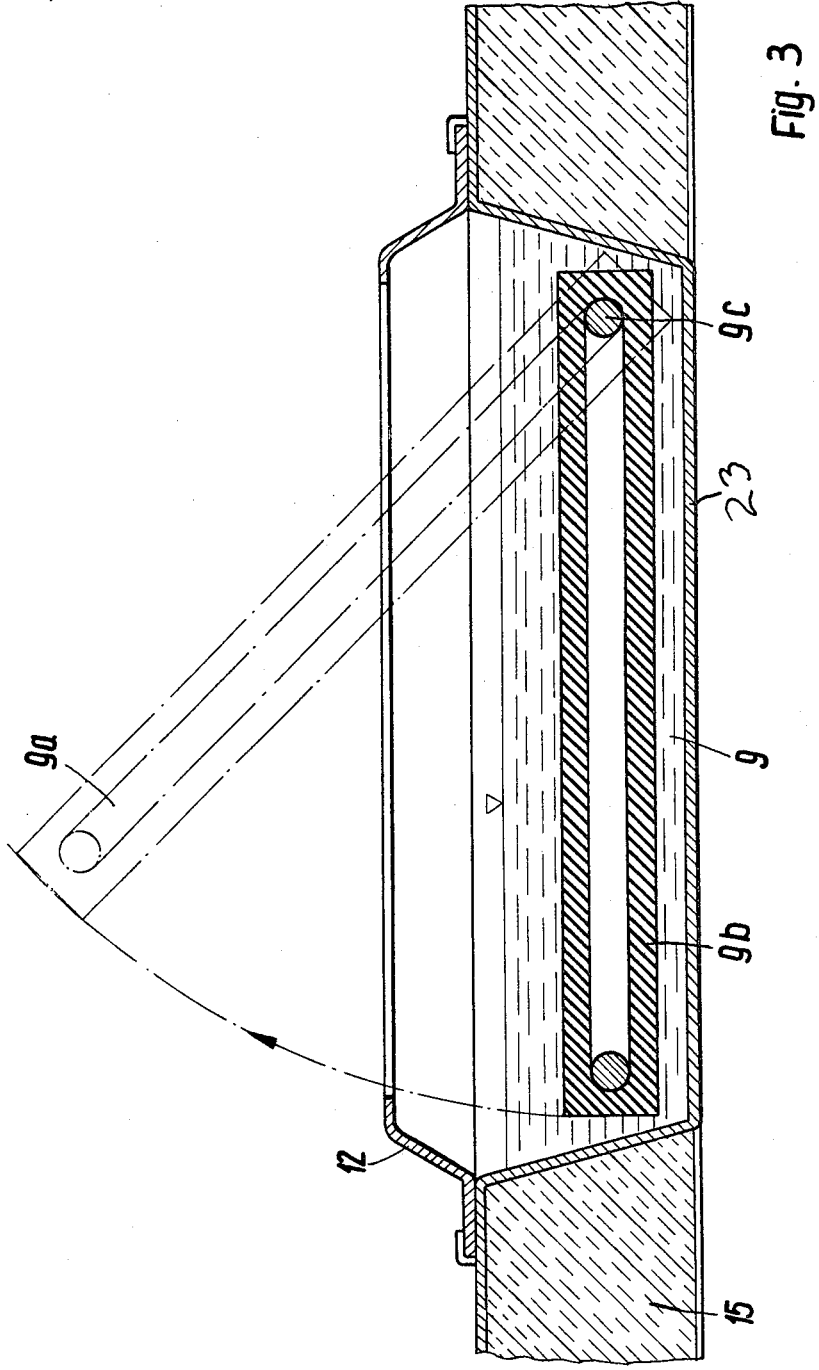

United States Patent Office 3,389,946
Patented June 25, 1968

3,389,946
CART FOR CARRYING TRAYS
Norbert Nicolaus, Elze, Hannover, and Heinz Krügener, Sarstedt, Germany, assignors to Firma Homann-Maytag G.m.b.H., Wuppertal-Vohwinkel, Germany, a corporation of Germany
Filed Feb. 16, 1966, Ser. No. 527,812
4 Claims. (Cl. 312—236)

ABSTRACT OF THE DISCLOSURE

Food service cart having a hot and a cold section, which hot section is heated by means within the cart, wherein means are provided for trays carrying both hot and cold food thereon with a flexible barrier wall so disposed within the cart as to separate the portions of the trays carrying hot and cold food thereon.

---

This invention relates to a cart adapted to carry trays therein. It more particularly refers to a movable cart adapted to carry hot and cold objects at the same time while substantially retaining the heat in the hot objects and substantially preventing the heating of the cold objects.

Carts and cabinets which carry trays, particularly trays of food are quite well known. They are used in airplanes and in hospitals to carry food or to store food prior to distribution thereof. These carts have been constructed in such a manner that hot or cold foods or other materials can be transported and stored with little or no temperature change in that which is carried by the cart. This has been accomplished in general by providing such carts with insulated floors, ceilings and walls.

An improvement in the construction of such carts has been the incorporation therein of heating elements and refrigeration systems, such that the food or other contents thereof cannot only be kept at the temperature at which it was placed in the cart or very nearly so, but so that the cart contents can be either cooled or heated while in storage or transit. This improvement has made it possible to serve tastefully prepared food in airplanes and in hospitals as well as other places where the kitchen is quite remote from the point of consumption of the food.

Unfortunately, although this heating and refrigeration has been quite an improvement over merely insulating the tray carrying carts, there has been a tendency for the food to dry out due to the heating.

It is therefore an object of this invention to provide an improvement in the art of food tray carrying carts.

It is another object of this invention to provide a food tray carrying cart which is capable of heating food while such is resident in the cart.

It is a further object of this invention to provide means in a food tray carrying cart of heating the food in such a manner that it does not dry out while in residence in the cart.

Other and additional objects of this invention will become apparent from a full consideration of this entire specification including the drawing and the appended claims.

In accord with and fulfilling these objects, this invention comprises as one of its aspects the heating of food in a food tray carrying cart by means of steam.

Understanding of this invention will be facilitated by reference to the accompanying drawing in which:

FIG. 1 is a front elevation partially in section of the dividing wall in the heating compartment of a food tray carrying cart;

FIG. 2 is a front elevation partially in section of a food tray carrying cart according to this invention;

FIG. 3 is a sectioned elevation of the heating means for a food tray carrying cart according to this invention; and FIG. 4 is a side elevation of a food tray carrying cart according to this invention.

Referring now to the drawing and particularly to FIG. 2 thereof, a food tray carrying cart according to this invention comprises a heating section 6 and a refrigeration section 5. The heating section and refrigeration section are suitably reproduced in mirror image behind the closed doors 20 so that the two outside sections are refrigerated while the two inside sections are heated. It may be desirable in some cases to provide a cart with only two sections, one heated and one refrigerated or with more than two heated and two refrigerated sections. It will be appreciated that this invention is not limited to a cart having four sections—two refrigerated and two heated—although this is the preferred embodiment.

Suitably the cart has outside insulated walls 13 and an insulated floor 15. The refrigerated sections 5 suitably have refrigeration units 14 mounted above them while the heated sections 6 have heating means 22 at or near the floor of these sections.

Where a four sectioned cart is used with the two heated sections in the center and the two cooled sections toward the outside of the cart, the heating means 22 is suitably positioned in the wall 11a separating the two heated sections. As shown in FIG. 3, the dividing wall 11a contains means 11 for vertical distribution of the steam generated in the heating means 22 throughout both heated sections.

The heating and steam producing means 22 is shown in greater detail in FIG. 3 and reference is now made to this figure. The heating means 22 is suitably mounted in the floor 15 and comprises a chamber 23 having a removable cover 12 and containing water 9. Mounted in the chamber is a heating element 9b suitably hinged at one end 9c to facilitate filling the chamber 23 with water. The cover 12 is perforated to permit produced steam to escape therefrom and be distributed throughout the heated compartments 6. It may in some cases be desirable to provide the heating element 9b as a hollow member adapted to hold a heat transfer medium 9a preheated prior to being placed in the heating element. Thus the heating element 9b has obtained sufficient heat from an external source prior to placing food trays in the cart so that the trays and their contents can be heated during storage and transit without requirement for an external source of heat or power during transit or storage.

The dividing wall between the heated section 6 and the cooled or refrigerated section 5 is uniquely designed to facilitate use of the cooled section 5 as an additional heated section with very simple modification of the wall. This dividing wall is best illustrated in FIG. 1 and reference is now made to this figure.

The dividing wall between the heated 6 and cooled 5 sections suitably contains vertical supports 1 having gaps or perforations vertically spaced so that they correspond to the vertical spacing of trays 3, each of which tray has an indented portion 8 adapted to fit over the shoulder 2 of the support 1 adjacent to such tray. Each of the vertical supports has removably affixed thereto a sealing member 4 so positioned that it substantially covers one or more, up to all, of the gaps or perforations in the vertical support thereby effectively separating the heated from the cooled sections. Any one or more of these seals 4 can be removed so as to effectively enlarge the heated space at a sacrifice of cooled space.

Suitably a cover member 10 encloses the top of the cart, and the cart is carried on a wheeled dolly.

It should be noted that through the use of the construction described herein a single tray can hold both hot and cold food and each can be subjected to heating or cooling as required without removal of the food from the tray.

This is accomplished because of the use of a gapped vertical support 1 having flexible sealing members 4. Each tray can be slid into place on its shoulder support 2 between the shoulder and the sealing member 4. The sealing member separates the hot from the cold food (as shown in FIG. 3 the hot food is on the right side of each tray and the cold food is on the left). Each tray may have placed thereon the appropriate food in its proper position prior to placing the tray in the cart.

What is claimed is:

1. A cart adapted to carry hot and cold foods on trays, which cart has two sections designed to house cold food and two sections adapted to house hot food, wherein the two sections adapted to be heated are adjacent to each other and the two sections adapted to be cooled are separated from each other by said heated sections, and means adapted to generate steam by situ boiling of water within said cart.

2. The improved cart claimed in claim 1 wherein said water is boiled by means of a self-contained heating element disposed in water in said cart unconnected to a source of heat and power outside of said cart.

3. The improved cart claimed in claim 1 wherein said heated section is separated from said cooled section by a perforated wall containing removable seals effectively closing said perforations so as to separate said heated and cooled sections thermodynamically.

4. The improved cart claimed in claim 1 wherein at least one tray in said cart contains both hot and cold foods thereon with said hot food being disposed on that portion of said tray which is in the heated section and the cold food being disposed on that portion of said tray which is in the cooled section of said cart; said tray being insertable and removable, as a single unit with all food thereon intact and in position, from both the heated and cooled sections of said cart simultaneously.

References Cited
UNITED STATES PATENTS

| | | | |
|---|---|---|---|
| 1,743,033 | 1/1930 | Ford | 126—375 |
| 2,196,035 | 4/1940 | Shaw | 219—19 |
| 2,640,478 | 6/1953 | Flournoy | 126—375 |
| 2,919,339 | 12/1959 | Hilliker | 126—273.5 |
| 3,130,288 | 4/1964 | Monaco et al. | 312—214 X |
| 3,222,114 | 12/1965 | Stentz | 312—214 |
| 3,275,393 | 9/1966 | Stentz | 312—214 |

CASMIR A. NUNBERG, *Primary Examiner.*